(12) United States Patent
Sun et al.

(10) Patent No.: US 11,873,882 B2
(45) Date of Patent: *Jan. 16, 2024

(54) TRANSMISSION STRUCTURE OF CORELESS TUBULAR MOTOR

(71) Applicant: HANGZHOU WISTAR MECHANICAL & ELECTRIC TECHNOLOGY CO., LTD, Zhejiang (CN)

(72) Inventors: Xudong Sun, Zhejiang (CN); Cailong Zhu, Zhejiang (CN)

(73) Assignee: HANGZHOU WISTAR MECHANICAL & ELECTRIC TECHNOLOGY CO., LTD, Zhejiang (CN)

( * ) Notice: Subject to any disclaimer, the term of this patent is extended or adjusted under 35 U.S.C. 154(b) by 107 days.

This patent is subject to a terminal disclaimer.

(21) Appl. No.: 17/615,169

(22) PCT Filed: May 14, 2020

(86) PCT No.: PCT/CN2020/090376
§ 371 (c)(1),
(2) Date: Nov. 30, 2021

(87) PCT Pub. No.: WO2020/238645
PCT Pub. Date: Dec. 3, 2020

(65) Prior Publication Data
US 2022/0235848 A1      Jul. 28, 2022

(30) Foreign Application Priority Data

May 31, 2019  (CN) ......................... 201910467640.6

(51) Int. Cl.
*F16H 1/46*      (2006.01)
*F16D 49/04*    (2006.01)
(Continued)

(52) U.S. Cl.
CPC ............... *F16H 1/46* (2013.01); *F16D 49/04* (2013.01); *H02K 7/116* (2013.01); *H02K 21/14* (2013.01); *H02K 2207/03* (2013.01)

(58) Field of Classification Search
CPC ........... F16H 1/46; F16D 49/04; H02K 7/114; H02K 7/116; H02K 21/14; H02K 23/58; H02K 2207/03
See application file for complete search history.

(56) References Cited

U.S. PATENT DOCUMENTS

| 8,004,132 B2 * | 8/2011 | Fukuoka | ................ H02K 7/116 310/83 |
| 2022/0231575 A1 * | 7/2022 | Sun | ........................ H02K 7/102 |

FOREIGN PATENT DOCUMENTS

| CN | 201118357 | 9/2008 |
| CN | 202435189 | 9/2012 |

(Continued)

OTHER PUBLICATIONS

International Search Report, issued in the corresponding PCT application No. PCT/CN2020/090376, dated Aug. 6, 2020, 7 pages.

*Primary Examiner* — Huan Le
(74) *Attorney, Agent, or Firm* — Hamre, Schumann, Mueller & Larson, P.C.

(57) ABSTRACT

A transmission structure of a coreless tubular motor includes a motor main body, a motor connecting seat, a primary gear ring, a primary planetary gear assembly, a brake outer sleeve, a secondary planetary gear assembly and a tertiary planetary gear assembly; the motor main body is a coreless motor; a brake driving member and a brake driven member which are coaxially provided are provided in and pass through the brake outer sleeve; the brake driving member is connected to an output end of the primary planetary gear assembly, the brake driven member is connected to an input end of the secondary planetary gear assembly, the brake (Continued)

driving member is in transmission connection with the brake driven member, and a braking assembly connected to the brake driving member and the brake driven member is provided on the inner side of the brake outer sleeve in the circumferential direction.

8 Claims, 9 Drawing Sheets

(51) Int. Cl.
*H02K 7/116* (2006.01)
*H02K 21/14* (2006.01)

(56) References Cited

FOREIGN PATENT DOCUMENTS

| | | | | |
|---|---|---|---|---|
| CN | 203504350 | | 3/2014 | |
| CN | 203504350 U | * | 3/2014 | ............... H02K 7/10 |
| CN | 110233546 | | 9/2019 | |
| CN | 110266145 | | 9/2019 | |
| JP | 2016-092902 | | 5/2016 | |

* cited by examiner

TRANSMISSION STRUCTURE OF CORELESS TUBULAR MOTOR

TECHNICAL FIELD OF THE INVENTION

The present invention belongs to the technical field of motor devices, and particularly relates to a transmission structure of a coreless tubular motor.

BACKGROUND OF THE INVENTION

With the rapid development of the mechanical and electrical industry, motors have been widely used people's life at present. For example, as driving devices, tubular motors have the advantages of compact structure, large torque, low rotating speed and the like, so the tubular motors are increasingly used in products that use motors to realize lifting motion, such as roller shutters, sun shading systems and projection screens. Since the motor shafts of the tubular motors are too high in rotating speed, for ease of use, speed reducers are generally provided on the tubular motors, so that the rotating speed of the output shafts satisfies the requirements for normal use. Existing DC tubular motors are generally ordinary rare-earth or ferrite motors, that is, they have the structural characteristic that rotor cores and magnetic shoes are attached to the housing. The existing tubular rare-earth or ferrite motors have many deficiencies. For example, firstly, due to the large mass of the rotor cores, the rotors have slow response, high energy consumption and large vibration, resulting in a serious damage to components and limiting the service life of the whole machine. Then, the rotor cores will generate eddy current in the magnetic field, resulting in motor heating, high energy consumption and low efficiency. Secondly, since the magnetic shoes (permanent magnets) are fixed on the housing, the magnetic shoes (permanent magnets) must have a certain thickness. When the outer diameter of the motors is given, the outer diameter of the motor rotors will be greatly limited, and the output torque of the motors is thus greatly limited. In addition, the speed reducers of the existing tubular motors cannot satisfy the requirements in term of the speed reduction ratio and are not compact enough in structure and poor in stability during the transmission process. These problems have caused great inconvenience to the existing tubular motors when in use.

In order to solve the deficiencies in the prior art, long-term exploration has been conducted, and a variety of solutions have been proposed. For example, Chinese Parent Document disclosed a planetary reducer of a tubular motor [200720184522.7], including a sun gear, an inner toothed end cover, an inner toothed sleeve and an inner toothed sleeve seat, wherein the planetary reducer is internally provided with: a primary support main body, on which three support pins are provided, primary planetary gears being provided on the support pins, gears being provided at lower ends of the primary planetary gears; a secondary support main body, on which three support pins being provided on the secondary support main body, secondary planetary gears being provided on the support pins, gears being provided at lower ends of the support pins; and, a tertiary support main body, on which three support pins are provided, tertiary planetary gears being provided on the support pins, output shafts being provided at lower ends of the support pins. Although the above solution solves the problem that the speed reducers of the existing tubular motors cannot satisfy the requirements in terms of the speed reduction ratio to a certain extent, this solution still has many deficiencies of ordinary rare-earth or ferrite motor. Meanwhile, this solution still has other deficiencies such as poor transmission stability.

SUMMARY OF THE INVENTION

In view of the above problems, an objective of the present invention is to provide a transmission structure of a coreless tubular motor, which has rational structure and uses a coreless motor structure with high transmission stability.

In order to achieve the above objective, the present invention employs the following technical solutions. A transmission structure of a coreless tubular motor is provided, including a motor main body, the motor main body being connected to one end of a primary gear ring through a motor connecting seat, a motor shaft of the motor main body being connected to a primary planetary gear assembly provided in the primary gear ring, the other end of the primary gear ring being connected to a secondary/tertiary gear ring having a secondary planetary gear assembly and a tertiary planetary gear assembly, an input end of the tertiary planetary gear assembly being connected to an output end of the secondary planetary gear assembly while an output end thereof being connected to an output shaft, wherein the motor main body is a coreless motor; a brake driving member and a brake driven member which are coaxially provided are provided in and pass through the brake outer sleeve; the brake driving member is connected to an output end of the primary planetary gear assembly, the brake driven member is connected to an input end of the secondary planetary gear assembly, and the brake driving member is in transmission connection with the brake driven member; and, a braking assembly connected to the brake driving member and the brake driven member is provided on the inner side of the brake outer sleeve in the circumferential direction.

In the transmission structure of a coreless tubular motor, the braking assembly includes a brake mandrel which is provided in the brake outer sleeve through a circumferential positioning structure; a cylindrical brake drum is provided at one end of the brake mandrel, and a brake torsion spring is sleeved on the brake drum; the brake driving member is provided with two driving jaws, and one end of the brake driven member close to the brake driving member passes through the brake mandrel and is provided with two driven jaws; the driving jaws and the driven jaws are staggered one by one, and any one of the driving jaws is located on one side of any one of the driven jaws; and, a brake control structure, which can make the brake torsion spring expand in the circumferential direction and make the brake driven member rotate synchronously with the brake driving member in the same direction when the brake driving member rotates in the circumferential direction or can make the brake torsion spring contract in the circumferential direction and make the brake driven member stop in the circumferential direction when the brake driven member rotates in the circumferential direction, is provided between the driving jaws and the driven jaws.

In the transmission structure of a coreless tubular motor, the brake control structure includes bent legs which are formed at two ends of the brake torsion spring and bent outward in the radial direction; any one of the two driven jaws of the brake driven member is located between the two bent legs, and any one of the two bent legs is located between the driven jaws and the driving jaws; steps which extend outward in the widthwise direction of the driven jaws and are resisted against one side of the driving jaws are provided on two sides of one end of each of the driven jaws close to the brake driven member; and, gaps for allowing the bent legs to extend therein are formed between the outer side of ends of the driven jaws away from the steps and the driving jaws.

In the transmission structure of a coreless tubular motor, the distance between the two bent legs of the brake torsion spring in the center line direction of the brake torsion spring is greater than the width of ends of the driven jaws away from the steps.

In the transmission structure of a coreless tubular motor, the brake mandrel includes a mandrel ring coaxially connected to the brake drum; the mandrel ring and the brake drum are of an integral structure, and the inner circumferential side of the mandrel ring is communicated with the inner circumferential side of the brake drum to form a mandrel passage; the circumferential positioning structure includes a number of positioning slots formed on the inner circumferential side of one end of the brake outer sleeve; the positioning slots are arranged in the circumferential direction at uniform intervals and extend in the axial direction of the brake outer sleeve; a number of positioning lugs in one-to-one correspondence to the positioning slots are provided on the outer circumferential side of the mandrel ring; and, the positioning lugs are clamped into the positioning slots, respectively.

In the transmission structure of a coreless tubular motor, the motor main body includes a motor shell; a carbon brush set connected to a control circuit is provided at one end of the motor shell; a rotor carrier with the motor shaft is rotatably provided on the carbon brush set, and a coreless coil is provided on the motor shaft; a permanent magnet located on the inner circumferential side of the coreless coil is provided in the motor shell; and, the motor shaft passes through the permanent magnet and extends to the outer side of the motor shell.

In the transmission structure of a coreless tubular motor, the brake driving member includes a driving mandrel which is coaxially and rotatably provided on the inner circumferential side of one end of the brake outer sleeve through a first rotating bearing; a driving member connecting hole is formed at one end of the driving mandrel, while the other end thereof is coaxially connected to a driving ring; the driving jaws are correspondingly provided on the outer circumferential side of the driving ring, respectively; and, one end of the driving ring away from the driving mandrel is coaxially connected to a rotating drum.

In the transmission structure of a coreless tubular motor, the brake driven member includes a driven mandrel which is coaxially and rotatably provided on the inner circumferential side of one end of the brake outer sleeve away from the driving mandrel through a second rotating bearing; a driven member connecting hole is formed at one end of the driven mandrel, while the other end thereof passes through the mandrel passage and is coaxially connected to a driven drum; the driven jaws are correspondingly provided on the outer circumferential side of one end of the driven drum, respectively; a rotating hole for allowing the rotating drum to be inserted therein is provided at one end of the driven drum, while a limiting ring is provided at the other end thereof; and, an annular limiting step resisted against the limiting ring is provided on the inner circumferential side of the brake drum.

Specifically, herein, the primary planetary gear assembly includes a primary planetary carrier having a primary planetary output shaft provided at its one end and connected to the driving member connecting hole; three primary planetary roller needles are provided on the primary planetary carrier in the circumferential direction at uniform intervals; primary planetary gears are provided on the primary planetary roller needles; the primary planetary gears are distributed in the circumferential direction at uniform intervals and all connected to the motor shaft of the motor main body; a number of primary gear teeth meshed with the primary planetary gears are provided on the inner circumferential side of the primary gear ring; and, the primary gear teeth and the primary planetary gears are of helical tooth structures. The secondary planetary gear assembly includes a secondary planetary carrier having a secondary planetary output shaft provided at its one end; three secondary planetary roller needles are provide at the other end of the secondary planetary carrier; secondary planetary gears are provided on the secondary planetary roller needles; the secondary planetary gears are distributed in the circumferential direction at uniform intervals and all meshed with a secondary center gear connected to the driven member connecting hole; and, a number of secondary/tertiary gear teeth meshed with the secondary planetary gears are provided on the inner circumferential side of the secondary/tertiary gear ring. The tertiary planetary gear assembly includes a tertiary planetary carrier having an output shaft provided at its one end; three tertiary planetary roller needles are provided at the other end of the tertiary planetary carrier in the circumferential direction at uniform intervals; tertiary planetary gears are provided on the tertiary planetary roller needles; the tertiary planetary gears are distributed in the circumferential direction at uniform intervals and all meshed with a small gear on the secondary planetary output shaft; and, secondary/tertiary gear teeth on the inner circumferential side of the secondary/tertiary gear ring are meshed with the tertiary planetary gears, respectively.

In the transmission structure of a coreless tubular motor, the brake outer sleeve is provided between the primary gear ring and the secondary/tertiary gear ring through a circumferential fixation structure.

In the transmission structure of a coreless tubular motor, the circumferential fixation structure includes a first concave-convex positioning assembly provided on the outer circumferential side of one end of the brake outer sleeve; a first concave-convex mating assembly corresponding to the first concave-convex positioning assembly is provided on the inner circumferential side of one end of the primary gear ring; the first concave-convex positioning assembly and the first concave-convex mating assembly are mutually clamped and positioned in the circumferential direction; a second concave-convex positioning assembly is provided on the outer circumferential side of the other end of the brake outer sleeve; a second concave-convex mating assembly corresponding to the second concave-convex positioning assembly is provided on the inner circumferential side of the secondary/tertiary gear ring; and, the second concave-convex positioning assembly and the second concave-convex mating assembly are mutually clamped and positioned in the circumferential direction.

Compared with the prior art, the present invention has the following advantages.

1. Since the rotor core structure is omitted, the coreless motor has no cogging effect and will not generate eddy current, thereby reducing heat generation, reducing energy consumption and improving efficiency. Moreover, since there is no rotor core, the mass of the whole rotor is greatly reduced, so that the response speed is greatly increased and the vibration is greatly weakened when the rotor starts or stops, and the service life of the whole machine is prolonged.

2. The permanent magnet is arranged inside the rotor core, so the radius of the rotor is increased when the outer diameter of the motor remains unchanged, and the output torque of the motor is thus increased.

3. The transmission between the primary planetary gear assembly and the secondary/tertiary planetary gear assembly is realized by the driving jaws and driven jaws, and the brake driving member and the brake driven member each have two corners and are resisted against each other, so that the transmission stability is improved, the speed reduction ratio is large, the layout of components is rational, and the structure is compact.

4. By making the brake torsion spring be in interference fit with the brake mandrel, the braking process is realized by the deformation of the torsion spring, thereby achieving good braking effect of the brake and high braking sensitivity.

in which: 1: primary gear ring; 2: primary planetary gear assembly; 21: primary planetary carrier; 211: primary planetary output shaft; 22: primary planetary roller needle; 23: primary planetary gear; 24: primary gear tooth; 3: secondary/tertiary gear ring; 4: secondary planetary gear assembly; 41: secondary planetary carrier; 411: secondary planetary output shaft; 42: secondary planetary roller needle; 43: secondary planetary gear; 44: secondary center gear; 45: secondary/tertiary gear tooth; 5: tertiary planetary gear assembly; 51: tertiary planetary carrier; 52: tertiary planetary roller needle; 53: tertiary planetary gear; 6: output shaft; 7: circumferential fixation structure; 71: first concave-convex positioning assembly; 72: first concave-convex mating assembly; 73: second concave-convex positioning assembly; 74: second concave-convex mating assembly; 8: brake outer sleeve; 81: brake driving member; 811: driving jaw; 812: driving mandrel; 8121: driving member connecting hole; 813: driving ring; 814: rotating drum; 815: first rotating bearing; 82: brake driven member; 821: driven jaw; 821*a*: step; 821*b*: gap; 822: driven mandrel; 8221: driven member connecting hole; 823: driven drum; 824: rotating hole; 825: limiting ring; 826: annular limiting step; 827: second rotating bearing; 83: brake mandrel; 831: brake drum; 832: mandrel ring; 833: mandrel passage; 84: brake torsion spring; 841: bent leg; 85: positioning slot; 86: positioning lug; 9: motor main body; 91: motor connecting seat; 92: motor shaft; 93: motor shell; 931: carbon brush set; 932: rotor carrier; 933: coreless coil; and, 934: permanent magnet.

DETAILED DESCRIPTION OF THE INVENTION

The present invention will be further described below in detail by specific implementations with reference to the accompanying drawings.

As shown in FIGS. 1 and 3-9, the transmission structure of a hollow tubular motor includes a motor main body 9. The motor main body 9 is connected to one end of a primary gear ring 1 through a motor connecting seat 91, and a motor shaft 92 of the motor main body 9 is connected to a primary planetary gear assembly 2 provided in the primary gear ring 1. The other end of the primary gear ring 1 is connected to a secondary/tertiary gear ring 3 having a secondary planetary gear assembly 4 and a tertiary planetary gear assembly 5. An input end of the tertiary planetary gear assembly 5 is connected to an output end of the secondary planetary gear assembly 4, while an output end thereof is connected to an output shaft 6. The motor main body 9 is a coreless motor. A brake driving member 81 and a brake driven member 82 which are coaxially provided are provided in and pass through the brake outer sleeve 8. The brake driving member 81 is connected to an output end of the primary planetary gear assembly 2, the brake driven member 82 is connected to an input end of the secondary planetary gear assembly 4, and the brake driving member 81 is in transmission connection with the brake driven member 82. A braking assembly connected to the brake driving member 81 and the brake driven member 82 is provided on the inner side of the brake outer sleeve 8 in the circumferential direction.

Since the rotor core structure is omitted in the motor main body 9, the coreless motor has no cogging effect and will not generate eddy current, thereby reducing heat generation, reducing energy consumption and improving efficiency. Moreover, since there is no rotor core, the mass of the whole rotor is greatly reduced, so that the response speed is greatly increased and the vibration is greatly weakened when the rotor starts or stops, and the service life of the whole machine is prolonged. Meanwhile, the permanent magnet 934 is arranged inside the rotor core, so the radius of the rotor is increased when the outer diameter of the motor remains unchanged, and the output torque of the motor is increased.

In this embodiment, the braking assembly includes a brake mandrel 83 which is provided in the brake outer sleeve 8 through a circumferential positioning structure. A cylindrical brake drum 831 is provided at one end of the brake mandrel 83, and a brake torsion spring 84 is sleeved on the brake drum 831. The brake driving member 81 is provided with two driving jaws 821, and one end of the brake driven member 82 close to the brake driving member 81 passes through the brake mandrel 83 and is provided with two driven jaws 821. The driving jaws 811 and the driven jaws 821 are staggered one by one, and any one of the driving jaws 811 is located on one side of any one of the driven jaws 821. A brake control structure, which can make the brake torsion spring 84 expand in the circumferential direction and make the brake driven member 82 rotate synchronously with the brake driving member 81 in the same direction when the brake driving member 81 rotates in the circumferential direction or can make the brake torsion spring 84 contract in the circumferential direction and make the brake driven member 82 stop in the circumferential direction when the brake driven member 82 rotates in the circumferential direction, is provided between the driving jaws 811 and the driven jaws 821.

Specifically, herein, the brake control structure includes bent legs 841 which are formed at two ends of the brake torsion spring 84 and bent outward in the radial direction. Any one of the two driven jaws 821 of the brake driven member 82 is located between the two bent legs 841, and any one of the two bent legs 841 is located between the driven jaws 821 and the driving jaws 811. Steps 821a which extend outward in the widthwise direction of the driven jaws 821 and are resisted against one side of the driving jaws 811 are provided on two sides of one end of each of the driven jaws 821 close to the brake driven member 82. Gaps 821b for allowing the bent legs 841 to extend therein are formed between the outer side of ends of the driven jaws 821a away from the steps and the driving jaws 821. Herein, the distance between the two bent legs 841 of the brake torsion spring 84 in the center line direction of the brake torsion spring 84 is greater than the width of ends of the driven jaws 821 away from the steps 821a.

Preferably, herein, the brake mandrel 83 includes a mandrel ring 832 coaxially connected to the brake drum 831. The mandrel ring 832 and the brake drum 831 are of an integral structure, and the inner circumferential side of the mandrel ring 832 is communicated with the inner circumferential side of the brake drum 831 to form a mandrel passage 833. The circumferential positioning structure includes a number of positioning slots 85 formed on the inner circumferential side of one end of the brake outer sleeve 8. The positioning slots 85 are arranged in the circumferential direction at uniform intervals and extend in the axial direction of the brake outer sleeve 8. A number of positioning lugs 86 in one-to-one correspondence to the positioning slots 85 are provided on the outer circumferential side of the mandrel ring 832. The positioning lugs 86 are clamped into the positioning slots 85, respectively.

The primary planetary gear assembly 2 is transmitted to the secondary planetary gear assembly 4 through the driving jaws 811 and the driven jaws 821 and then connected to the output shaft 6 through the tertiary planetary gear assembly 5, so that the transmission stability is improved. Meanwhile, a brake mandrel 83 can be provided in the brake outer sleeve 8, a brake torsion spring 84 is sleeved on the brake mandrel 83, and the brake torsion spring 84 acts on the driving jaws 811 and the driven jaws 821, respectively, so that the purpose of providing a brake between the primary planetary gear assembly and the secondary and tertiary planetary gear assemblies is achieved.

Figure 9:
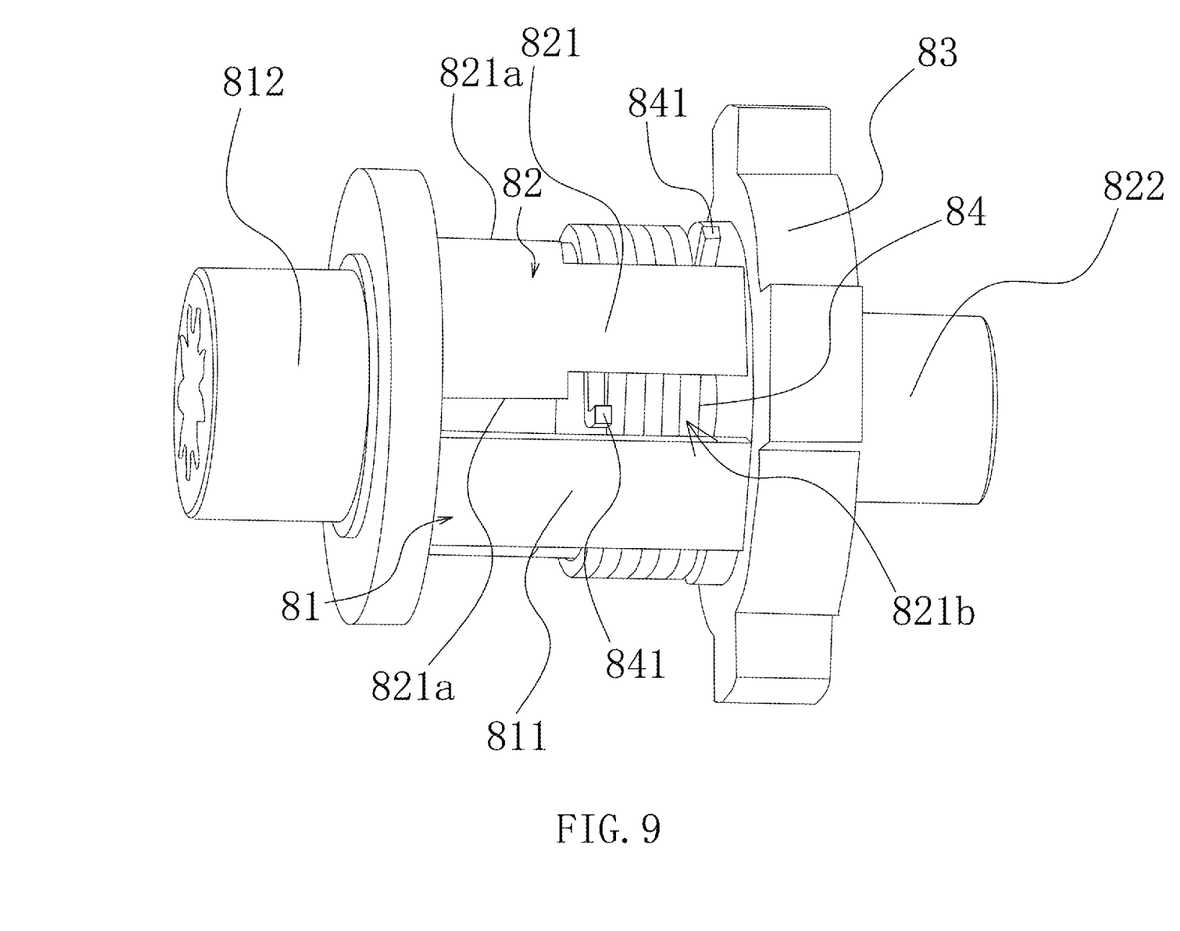
FIG. 9 is a schematic structure diagram of a braking process in the present invention.

Specifically, as shown in FIG. 9, no manner when the brake driving member 81 rotates forward or backward in the circumferential direction, the driving jaws 811 are driven to rotate together. The driving jaws 811 first come into contact with one bend leg 841 of the brake torsion spring 84. When the driving jaws 811 push the bent legs 841, the brake torsion spring 84 expands in the circumferential direction, so that the inner diameter of the brake torsion spring 84 becomes larger, and the brake torsion spring 84 is separated from the brake mandrel 83. When the driving jaws 811 continuously rotates to drive the bent legs 841 to move in the gaps 821b, the inner diameter of the brake torsion spring 84 further becomes larger until one side of the driving jaws 811 is resisted against the steps 821a of the driven jaws 821, so that the driving jaws 811 drive the driven jaws 821 to rotate synchronously when the brake torsion spring 841 is in an expanded state, and the power is transferred to a next stage. No matter when the brake driven member 82 rotates forward or backward in the circumferential direction, the driven jaws 821 are driven to rotate together. Before the steps 821a of the driven jaws 821 do not come into with the driving jaws 811, the driven jaws 821 first make the inner diameter of the brake torsion spring 84 become smaller, so that the brake torsion spring 84 is tightly clung to the brake mandrel 83, and a large friction is generated between the brake torsion spring 84 and the brake mandrel 83. Thus, the whole braking process is realized, and the power will not be transferred to the brake driving member 81.

For the brake part in this embodiment, the brake mandrel 83 and the brake outer sleeve 8 are fixed. The brake torsion spring 84 is in interference fit with the brake mandrel 83, and the brake driving member 81 and the brake driven member 82 each have two corners. During rotation, the torque of the motor shaft 92 is transferred to the brake driving member through the primary planetary gear assembly 2. Regardless of clockwise rotation or counterclockwise rotation, the brake driving member 81 will make the inner diameter of the brake torsion spring 84 larger, so that the brake torsion spring 84 is separated from the brake mandrel 83, and the torque is transferred to the driven member 82, then transferred to the secondary planetary gear assembly 4 and the tertiary planetary gear assembly 5 and finally transferred out by the output shaft 6. When the torque is transferred from the output shaft 6 to the secondary planetary gear assembly 4 and the tertiary planetary gear assembly 5 and then to the brake driven member 82, regardless of clockwise rotation or counterclockwise rotation, the brake driven member 82 will make the inner diameter of the brake torsion spring 84 smaller, so that the brake torsion spring 84 is tightly clung to the brake mandrel 83, and a large friction is generated between the brake torsion spring 84 and the brake mandrel 83. Moreover, since the brake mandrel 83 is fixed, the torque cannot be transferred to the primary planetary gear assembly 2, thereby realizing the braking effect.

Figure 1:
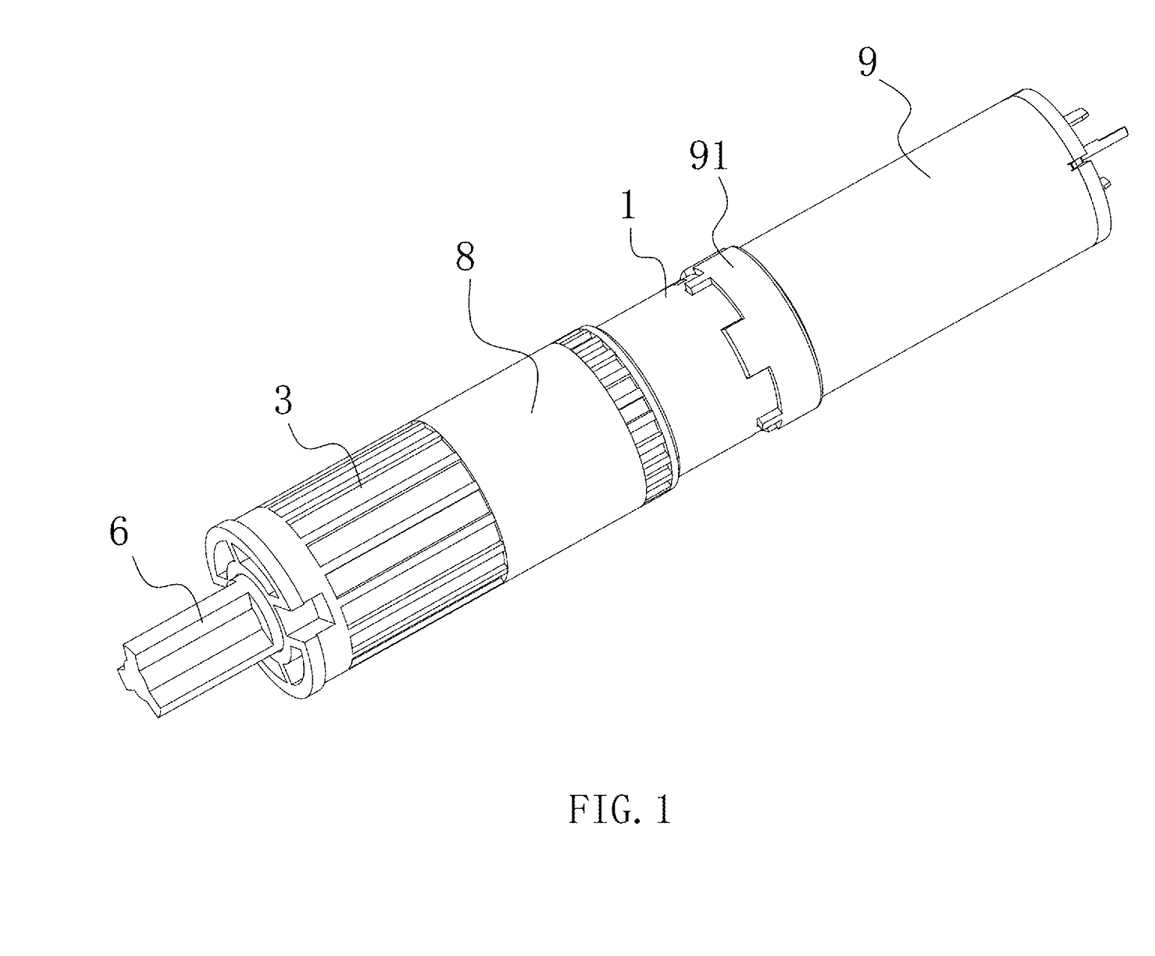
FIG. 1 is a schematic structure diagram of the present invention.
Figure 2:
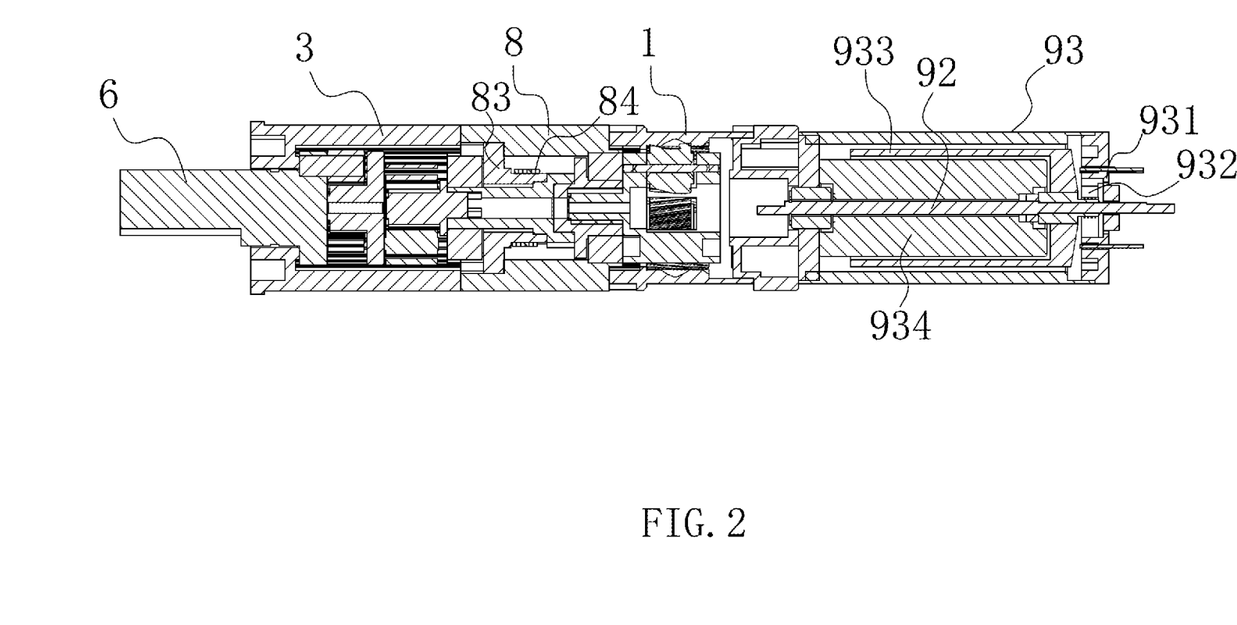
FIG. 2 is a sectional view of the present invention.
Figure 3:
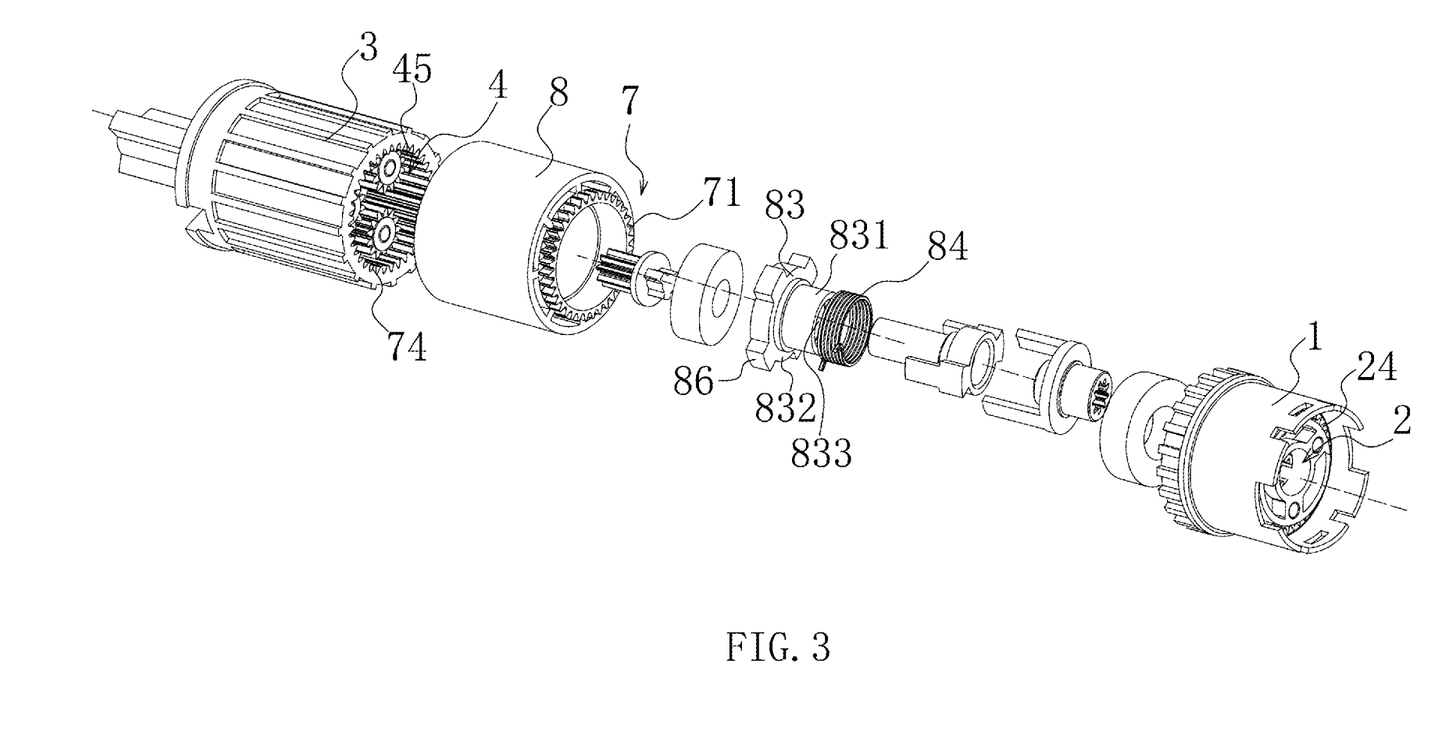
FIG. 3 is an exploded view of the present invention when the motor main body is not mounted.
Figure 4:
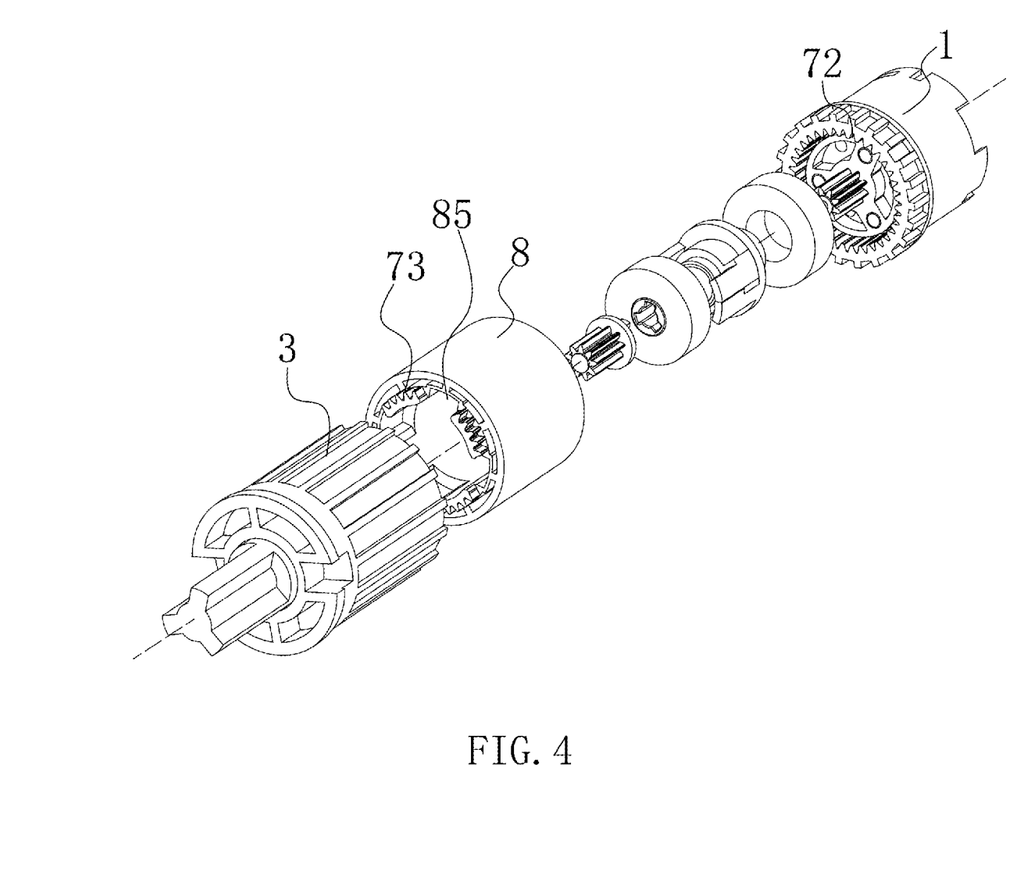
FIG. 4 is an exploded view of the present invention from another perspective when the motor main body is not mounted in the present invention.
Figure 5:
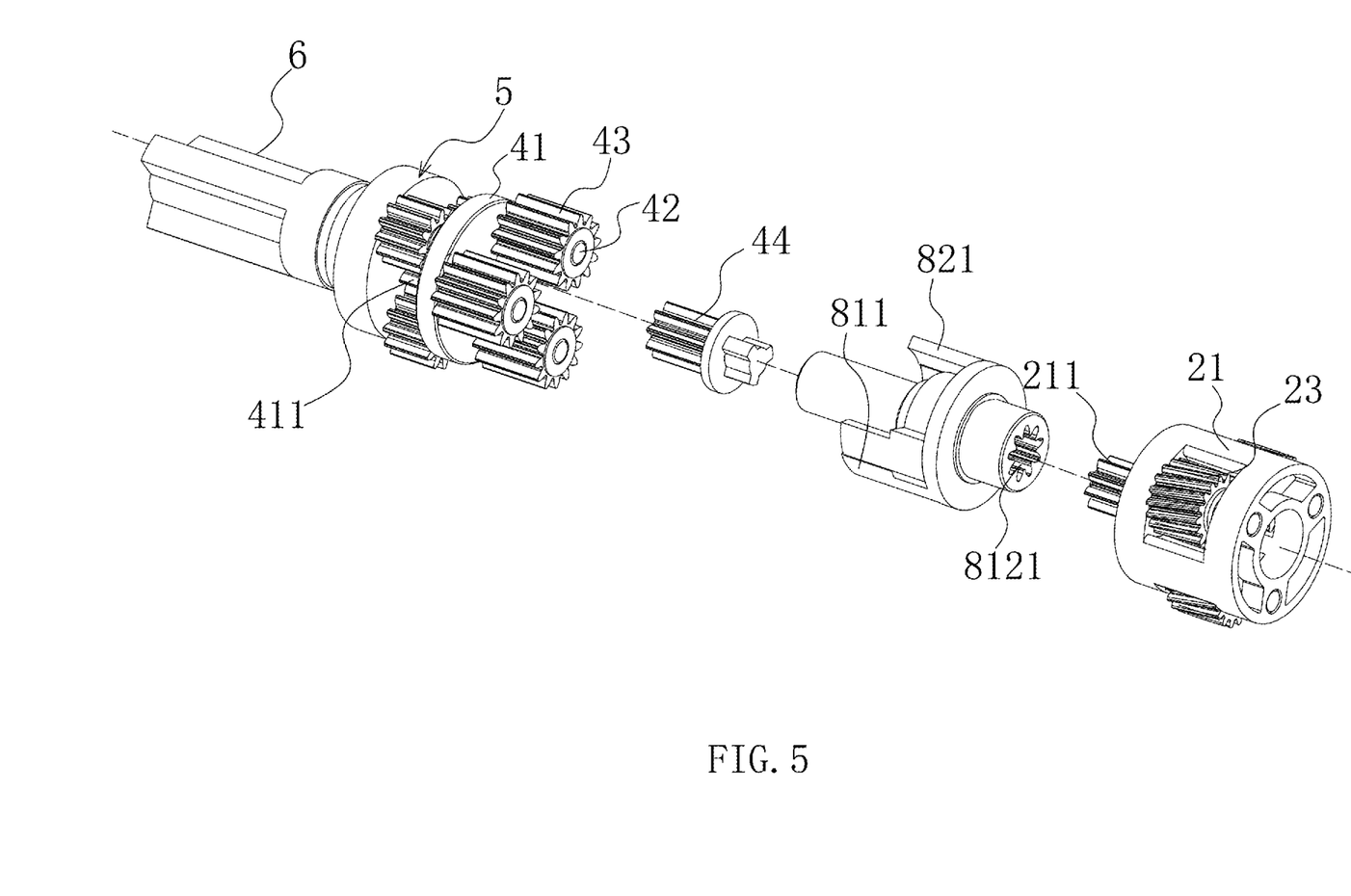
FIG. 5 is an exploded view of the present invention when each planetary gear assembly is connected.
Figure 6:
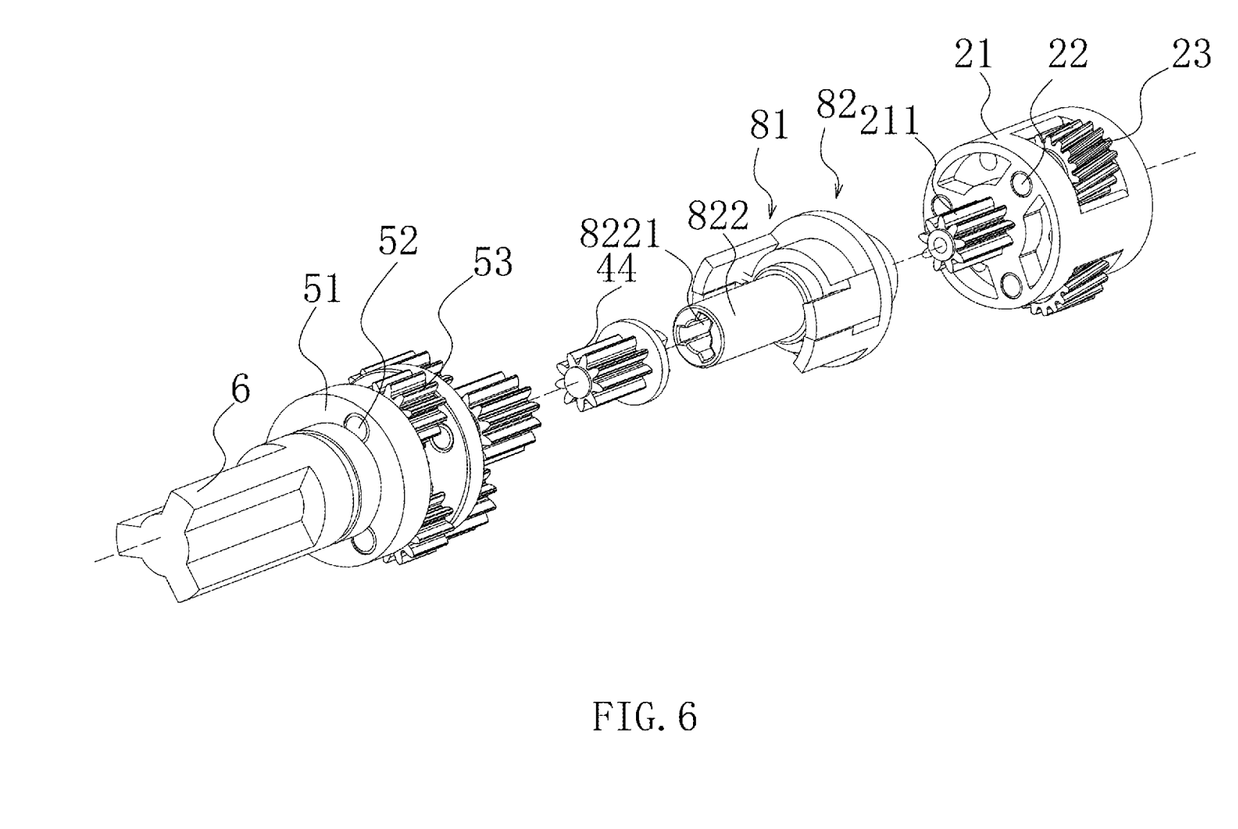
FIG. 6 is an exploded view of the present invention from another perspective when each planetary gear assembly is connected.
Figure 7:
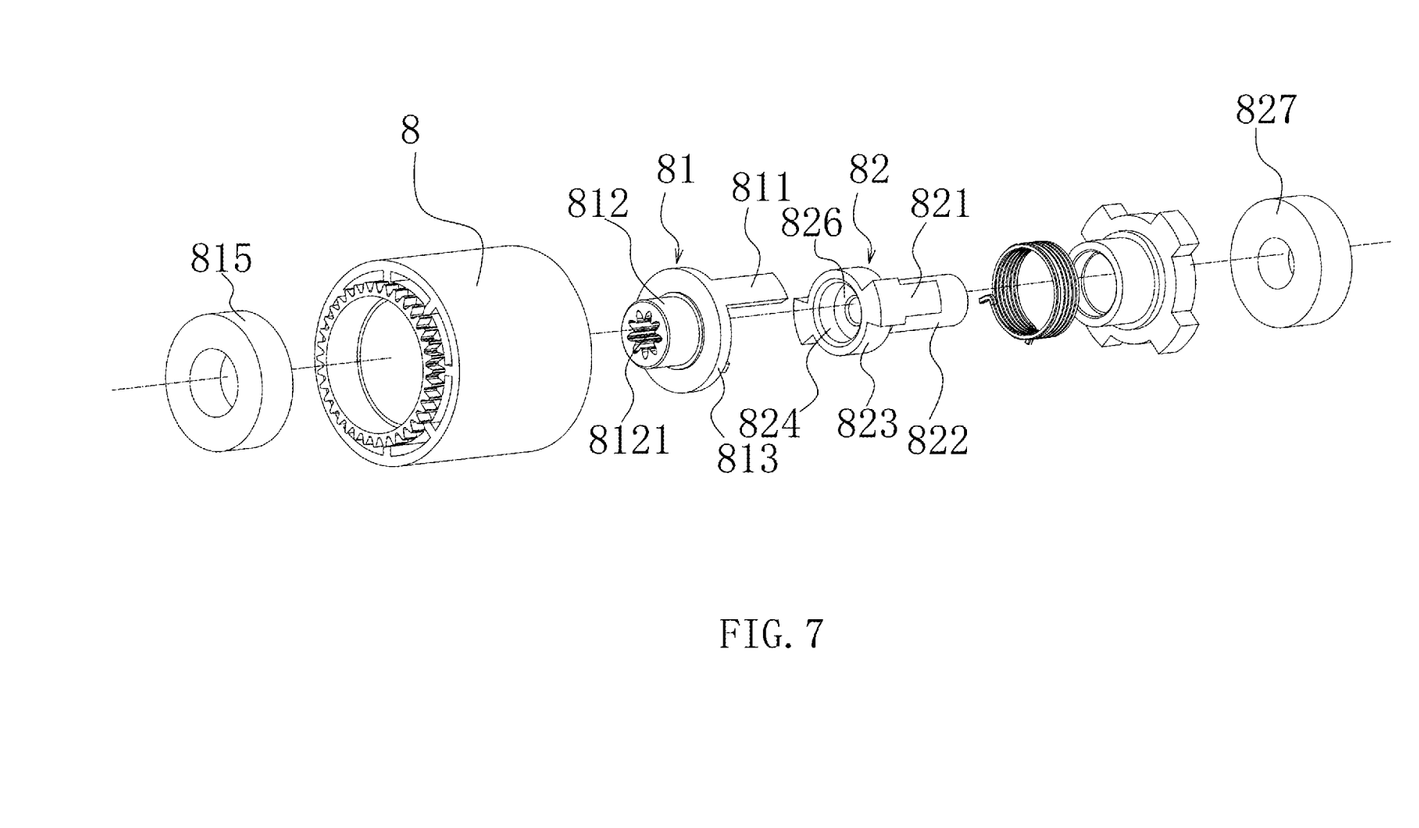
FIG. 7 is a partially exploded view of the present invention.
Figure 8:
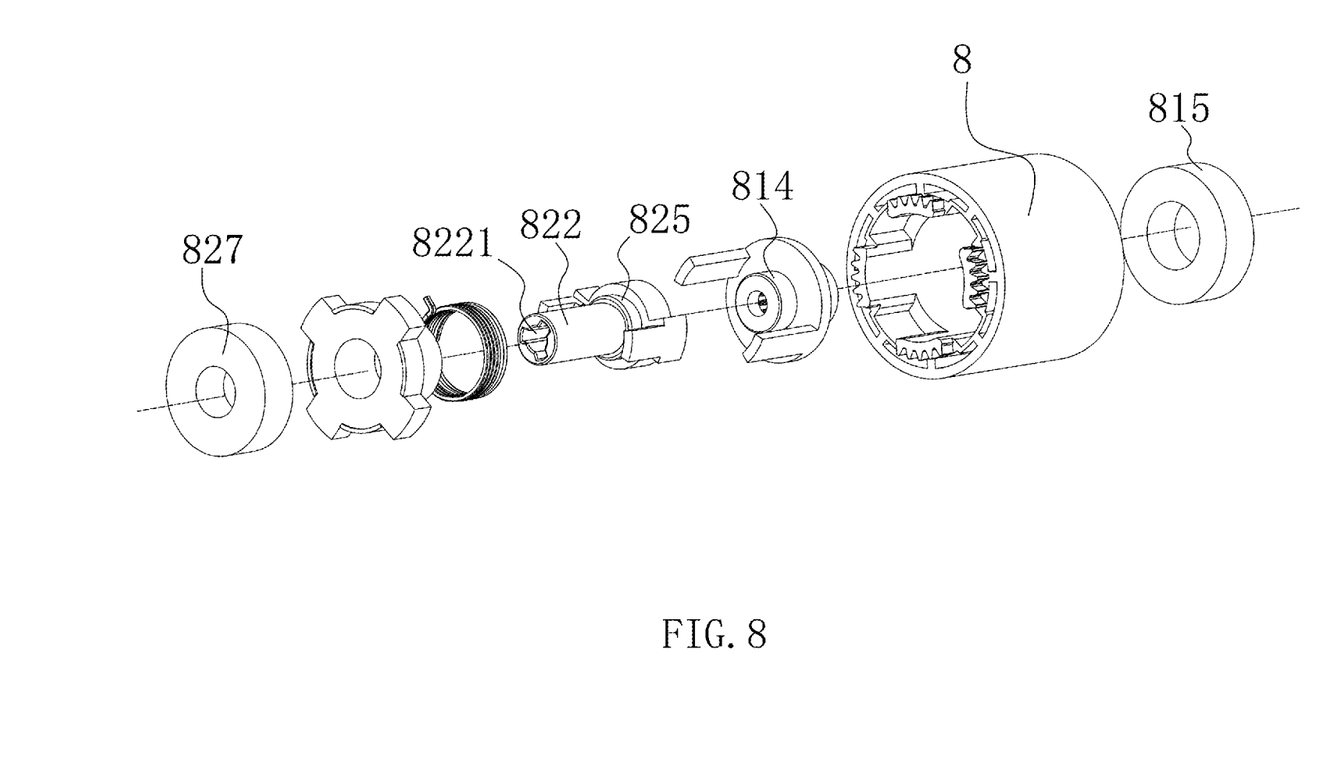
FIG. 8 is a partially exploded view of the present invention from another perspective.

As shown in FIG. 2, the motor main body 9 includes a motor shell 93. A carbon brush set 931 connected to a control circuit is provided at one end of the motor shell 93. A rotor carrier 932 with the motor shaft 92 is rotatably provided on the carbon brush set 931, and a coreless coil 933 is provided on the motor shaft 92. A permanent magnet 934 located on the inner circumferential side of the coreless coil 933 is provided in the motor shell 93. The motor shaft 92 passes through the permanent magnet 934 and extends to the outer side of the motor shell 93.

As shown in FIGS. 1 and 3-8, specifically, in this embodiment, the brake driving member 81 includes a driving mandrel 812 which is coaxially and rotatably provided on the inner circumferential side of one end of the brake outer sleeve 8 through a first rotating bearing 815. A driving member connecting hole 8121 is formed at one end of the driving mandrel 812, while the other end thereof is coaxially connected to a driving ring 813. The driving jaws 811 are correspondingly provided on the outer circumferential side of the driving ring 813, respectively. One end of the driving ring 813 away from the driving mandrel 812 is coaxially connected to a rotating drum 814.

Herein, the brake driven member 82 includes a driven mandrel 822 which is coaxially and rotatably provided on the inner circumferential side of one end of the brake outer sleeve 8 away from the driving mandrel 812 through a second rotating bearing 827. A driven member connecting hole 8221 is formed at one end of the driven mandrel 822, while the other end thereof passes through the mandrel passage 833 and is coaxially connected to a driven drum 823. The driven jaws 821 are correspondingly provided on the outer circumferential side of one end of the driven drum 823, respectively. A rotating hole 824 for allowing the rotating drum 814 to be inserted therein is provided at one end of the driven drum 823, while a limiting ring 825 is provided at the other end thereof. An annular limiting step 826 resisted against the limiting ring 825 is provided on the inner circumferential side of the brake drum 831.

Further, herein, the primary planetary gear assembly 2 includes a primary planetary carrier 21 having a primary planetary output shaft 211 provided at its one end and connected to the driving member connecting hole 8121. Three primary planetary roller needles 22 are provided on the primary planetary carrier 21 in the circumferential direction at uniform intervals. Primary planetary gears 23 are provided on the primary planetary roller needles 22, and the primary planetary gears 23 are distributed in the circumferential direction at uniform intervals and all connected to the motor shaft of the motor main body. A number of primary gear teeth 24 meshed with the primary planetary gears 23 are provided on the inner circumferential side of the primary gear ring 1. The primary gear teeth 24 and the primary planetary gears 23 are of helical tooth structures.

Similarly, the secondary planetary gear assembly 4 includes a secondary planetary carrier 41 having a secondary planetary output shaft 411 provided at its one end. Three secondary planetary roller needles 42 are provide at the other end of the secondary planetary carrier 41. Secondary planetary gears 43 are provided on the secondary planetary roller needles 42. The secondary planetary gears 43 are distributed in the circumferential direction at uniform intervals and all meshed with a secondary center gear 44 connected to the driven member connecting hole 8221. A number of secondary/tertiary gear teeth 45 meshed with the secondary planetary gears 43 are provided on the inner circumferential side of the secondary/tertiary gear ring 3. Herein, the tertiary planetary gear assembly 5 includes a tertiary planetary carrier 51 having an output shaft 6 provided at its one end. Three tertiary planetary roller needles 52 are provided at the other end of the tertiary planetary carrier 51 in the circumferential direction at uniform intervals. Tertiary planetary gears 53 are provided on the tertiary planetary roller needles 52. The tertiary planetary gears 53 are distributed in the circumferential direction at uniform intervals and all meshed with a small gear on the secondary planetary output shaft 411. Secondary/tertiary gear teeth 45 on the inner circumferential side of the secondary/tertiary gear ring 3 are meshed with the tertiary planetary gears 53, respectively.

In order to position the primary gear ring 1 and the secondary/tertiary gear ring 3 at two ends of the brake outer sleeve 8, herein, the brake outer sleeve 8 is provided between the primary gear ring 1 and the secondary/tertiary gear ring 3 through a circumferential fixation structure 7. Preferably, the circumferential fixation structure 7 includes a first concave-convex positioning assembly 71 provided on the outer circumferential side of one end of the brake outer sleeve 8. A first concave-convex mating assembly 72 corresponding to the first concave-convex positioning assembly 71 is provided on the inner circumferential side of one end of the primary gear ring 1. The first concave-convex positioning assembly 71 and the first concave-convex mating assembly 72 are mutually clamped and positioned in the circumferential direction. A second concave-convex positioning assembly 73 is provided on the outer circumferential side of the other end of the brake outer sleeve 8. A second concave-convex mating assembly 74 corresponding to the second concave-convex positioning assembly 73 is provided on the inner circumferential side of the secondary/tertiary gear ring 3. The second concave-convex positioning assembly 73 and the second concave-convex mating assembly 74 are mutually clamped and positioned in the circumferential direction. Preferably, herein, all the first concave-convex positioning assembly 71, the first concave-convex mating assembly 72, the second concave-convex positioning assembly 73 and the second concave-convex mating assembly 74 can be of positioning teeth structures, so that circumferential positioning is realized by inserting teeth into each other.

The specific embodiments described herein are merely for illustrating the spirit of the present invention. Those skilled in the art can make various modifications or supplements to the specific embodiments described herein or replace the specific embodiments described herein in a similar way, without departing from the spirit of the present invention or the scope defined by the appended claims.

Although the terms such as the primary gear ring 1, the primary planetary gear assembly 2, the primary planetary carrier 21, the primary planetary output shaft 211, the primary planetary roller needle 22, the primary planetary gear 23, the primary gear tooth 24, the secondary/tertiary gear ring 3, the secondary planetary gear assembly 4, the secondary planetary carrier 41, the secondary planetary output shaft 411, the secondary planetary roller needle 42, the secondary planetary gear 43, the secondary center gear 44, the secondary/tertiary gear tooth 45, the tertiary planetary gear assembly 5, the tertiary planetary carrier 51, the tertiary planetary roller needle 52, the tertiary planetary gear 53, the output shaft 6, the circumferential fixation structure 7, the first concave-convex positioning assembly 71, the first concave-convex mating assembly 72, the second concave-convex positioning assembly 73, the second concave-convex mating assembly 74, the brake outer sleeve 8, the brake driving member 81, the driving jaw 811, the driving mandrel 812, the driving member connecting hole 8121, the driving ring 813, the rotating drum 814, the first rotating bearing 815, the brake driven member 82, the driven jaw 821, the step 812a, the gap 812b, the driven mandrel 822, the driven member connecting hole 8221, the driven drum 823, the rotating hole 824, the limiting ring 825, the annular limiting step 826, the second rotating bearing 827, the brake mandrel 83, the brake drum 831, the mandrel ring 832, the mandrel passage 833, the brake torsion spring 84, the bent leg 841, the positioning slot 85, the positioning lug 86, the motor main body 9, the motor connecting seat 91, the motor shaft 92, the motor shell 93, the carbon brush set 931, the rotor carrier 932, the coreless coil 933 and the permanent magnet 934 are frequently used herein, the possibility of using other terms is not excluded. These terms are merely used to describe and explain the essence of the present invention more conveniently, and the interpretation of the terms into any additional limitations shall be deviated from the spirit of the present invention.

The invention claimed is:

1. A transmission structure of a coreless tubular motor, comprising a motor main body, the motor main body being connected to one end of a primary gear ring through a motor connecting seat, a motor shaft of the motor main body being connected to a primary planetary gear assembly provided in the primary gear ring, the other end of the primary gear ring being connected to a secondary/tertiary gear ring having a secondary planetary gear assembly and a tertiary planetary gear assembly, an input end of the tertiary planetary gear assembly being connected to an output end of the secondary planetary gear assembly while an output end thereof being connected to an output shaft, wherein the motor main body is a coreless motor; a brake driving member and a brake driven member which are coaxially provided are provided in and pass through a brake outer sleeve; the brake driving member is connected to an output end of the primary planetary gear assembly, the brake driven member is connected to an input end of the secondary planetary gear assembly, and the brake driving member is in transmission connection with the brake driven member; and, a braking assembly connected to the brake driving member and the brake driven member is provided on the inner side of the brake outer sleeve in the circumferential direction,     wherein the brake outer sleeve is provided between the primary gear ring and the secondary/tertiary gear ring through a circumferential fixation structure,     wherein the circumferential fixation structure comprises a first concave-convex positioning assembly provided on the outer circumferential side of one end of the brake outer sleeve; a first concave-convex mating assembly corresponding to the first concave-convex positioning assembly is provided on the inner circumferential side of one end of the primary gear ring; the first concave-convex positioning assembly and the first concave-convex mating assembly are mutually clamped and positioned in the circumferential direction; a second concave-convex positioning assembly is provided on the outer circumferential side of the other end of the brake outer sleeve; a second concave-convex mating assembly corresponding to the second concave-convex positioning assembly is provided on the inner circumferential side of the secondary/tertiary gear ring; and, the second concave-convex positioning assembly and the second concave-convex mating assembly are mutually clamped and positioned in the circumferential direction.

2. The transmission structure of a coreless tubular motor according to claim 1, wherein the braking assembly comprises a brake mandrel which is provided in the brake outer sleeve through a circumferential positioning structure; a cylindrical brake drum is provided at one end of the brake mandrel, and a brake torsion spring is sleeved on the brake drum; the brake driving member is provided with two driving jaws, and one end of the brake driven member close to the brake driving member passes through the brake mandrel and is provided with two driven jaws; the driving jaws and the driven jaws are staggered one by one, and any one of the driving jaws is located on one side of any one of the driven jaws; and, a brake control structure, which can make the brake torsion spring expand in the circumferential direction and make the brake driven member rotate synchronously with the brake driving member in the same direction when the brake driving member rotates in the circumferential direction or can make the brake torsion spring contract in the circumferential direction and make the brake driven member stop in the circumferential direction when the brake driven member rotates in the circumferential direction, is provided between the driving jaws and the driven jaws.

3. The transmission structure of a coreless tubular motor according to claim 2, wherein the brake mandrel comprises a mandrel ring coaxially connected to the brake drum; the mandrel ring and the brake drum are of an integral structure, and the inner circumferential side of the mandrel ring is communicated with the inner circumferential side of the brake drum to form a mandrel passage; the circumferential positioning structure comprises a number of positioning slots formed on the inner circumferential side of one end of the brake outer sleeve; the positioning slots are arranged in the circumferential direction at uniform intervals and extend in the axial direction of the brake outer sleeve; a number of positioning lugs in one-to-one correspondence to the positioning slots are provided on the outer circumferential side of the mandrel ring; and, the positioning lugs are clamped into the positioning slots, respectively.

4. The transmission structure of a coreless tubular motor according to claim 3, wherein the motor main body comprises a motor shell; a carbon brush set connected to a control circuit is provided at one end of the motor shell; a rotor carrier with the motor shaft is rotatably provided on the carbon brush set, and a coreless coil is provided on the motor shaft; a permanent magnet located on the inner circumferential side of the coreless coil is provided in the motor shell; and, the motor shaft passes through the permanent magnet and extends to the outer side of the motor shell.

5. The transmission structure of a coreless tubular motor according to claim 3, wherein the brake driving member comprises a driving mandrel which is coaxially and rotatably provided on the inner circumferential side of one end of the brake outer sleeve through a first rotating bearing; a driving member connecting hole is formed at one end of the driving mandrel, while the other end thereof is coaxially connected to a driving ring; the driving jaws are correspondingly provided on the outer circumferential side of the driving ring, respectively; and, one end of the driving ring away from the driving mandrel is coaxially connected to a rotating drum.

6. The transmission structure of a coreless tubular motor according to claim 5, wherein the brake driven member comprises a driven mandrel which is coaxially and rotatably provided on the inner circumferential side of one end of the brake outer sleeve away from the driving mandrel through a second rotating bearing; a driven member connecting hole is formed at one end of the driven mandrel, while the other end thereof passes through the mandrel passage and is coaxially connected to a driven drum; the driven jaws are correspondingly provided on the outer circumferential side of one end of the driven drum, respectively; a rotating hole for allowing the rotating drum to be inserted therein is provided at one end of the driven drum, while a limiting ring is provided at the other end thereof; and, an annular limiting step resisted against the limiting ring is provided on the inner circumferential side of the brake drum.

7. The transmission structure of a coreless tubular motor according to claim 1, wherein the brake control structure comprises bent legs which are formed at two ends of the brake torsion spring and bent outward in the radial direction; any one of the two driven jaws of the brake driven member is located between the two bent legs, and any one of the two bent legs is located between the driven jaws and the driving jaws; steps which extend outward in the widthwise direction of the driven jaws and are resisted against one side of the driving jaws are provided on two sides of one end of each of the driven jaws close to the brake driven member;

and, gaps for allowing the bent legs to extend therein are formed between the outer side of ends of the driven jaws away from the steps and the driving jaws.

8. The transmission structure of a coreless tubular motor according to claim 7, wherein the distance between the two bent legs of the brake torsion spring in a center line direction of the brake torsion spring is greater than a width of ends of the driven jaws away from the steps.

\* \* \* \* \*